INVENTOR.
John B. Wiley
BY
Albert H. Reuther
His Attorney

May 16, 1967 J. B. WILEY 3,320,451
DYNAMOELECTRIC MACHINE ASSEMBLY
Original Filed Nov. 24, 1961 7 Sheets-Sheet 4

Fig. 7

INVENTOR.
John B. Wiley
BY
Albert H. Reutter
His Attorney

May 16, 1967  J. B. WILEY  3,320,451
DYNAMOELECTRIC MACHINE ASSEMBLY
Original Filed Nov. 24, 1961  7 Sheets-Sheet 5

INVENTOR.
John B. Wiley
BY
Albert H. Reuther
His Attorney

INVENTOR.
John B. Wiley
BY
Albert H. Reuther
His Attorney

May 16, 1967 J. B. WILEY 3,320,451
DYNAMOELECTRIC MACHINE ASSEMBLY
Original Filed Nov. 24, 1961 7 Sheets-Sheet 7

INVENTOR.
John B. Wiley
BY
Albert H. Reuther
His Attorney

United States Patent Office 3,320,451
Patented May 16, 1967

3,320,451
DYNAMOELECTRIC MACHINE ASSEMBLY
John B. Wiley, London, Ontario, Canada, assignor to General Motors Corporation, Detroit, Mich., a corporation of Delaware
Original application Nov. 24, 1961, Ser. No. 154,657. Divided and this application Oct. 4, 1965, Ser. No. 492,454
3 Claims. (Cl. 310—259)

This is a division of copending U.S. application S.N. 154,657, Wiley, filed Nov. 24, 1961, now abandoned.

This invention relates to a dynamoelectric machine means, and, more particularly, to a multi-part stator and rotor assembly for use therewith.

An object of this invention is to provide a new and improved dynamoelectric machine stator assembly readily accessible for servicing and handling with a minimum of effort and repair time required to change stator windings.

Another object of this invention is to provide a dynamoelectric machine stator assembly including first and second concentric portions one of which includes a spiral of continuous metal strip material substantially solid throughout and the second of which is formed by a laterally slotted metal strip material bent into a spiral configuration to increase size of slots into which electrical windings can be fitted from an outer periphery thereof around which the first solid spiral portion can be fitted concentrically thereto, the second spiral portion with the windings being releasable and replaceable as a subassembly.

Another object of this invention is to provide a dynamoelectric machine stator assembly including an outer substantially solid metal spiral portion of continuous strip material and a radially inner movable and replaceable wound stator portion formed initially from a laterally slotted metal strip material having a notch extending into a bottom of each slot and relatively shallow cut-outs in alignment with teeth defining the slots which are expanded laterally during spiralling of the inner strip material then fitted with electrical windings encapsulated with an insulating material prior to machining away of interconnecting strip metal to form an opening out of each notch so as to leave only metal teeth which are held both by windings and insulating material in locking press-fitted as well as magnetically attracted electrical relation to the outer spiral portion of the stator assembly permitting a savings in both metal and insulating materials.

A further object of this invention is to provide a dynamoelectric machine assembly including a multi-spiral stator with windings in an inner portion thereof press-fitted to an outer portion mounted in a cylindrical frame pre-determined slots therein adapted to be fitted with hook-like ends of substantially L-shaped clip means to hold end cover means snapped in assembled relation thereto by engagement with axial openings in the cover means that provide journalling support for a rotor radially inside the multi-spiral stator.

Another object of this invention is to provide dynamoelectric machine components such as stators and rotors having at least one spiral portion formed by a continuous strip of metal material, a die cast, sintered as well as solid malleable iron material in all of which slots can be machined open between teeth to provide inexpensive and readily replaceable subassembly components requiring a minimum in metal and insulating materials.

Further objects and advantages of the present invention will be apparent from the following description, reference being had to the accompanying drawings wherein preferred embodiments of the present invention are clearly shown.

Figure 1:
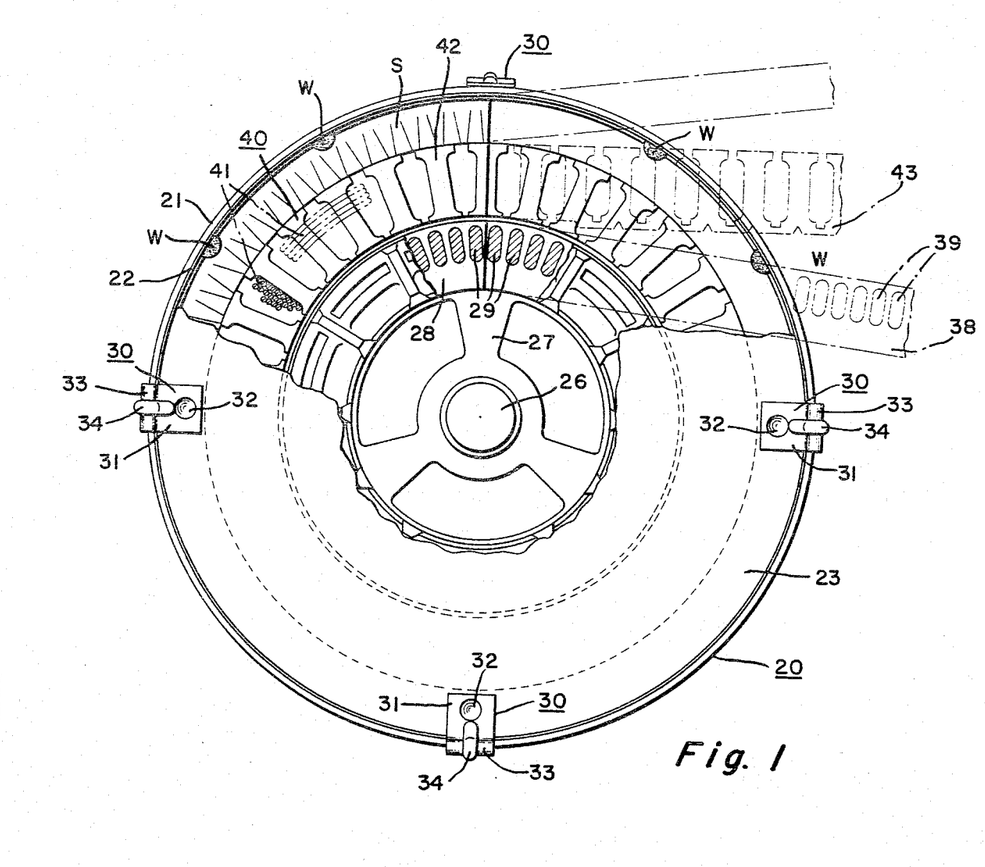
FIGURE 1 is an end view of a dynamoelectric machine assembly in accordance with the present invention and partially broken away to illustrate in phantom origin of components therein.

FIGURE 1 illustrates a dynamoelectric machine assembly generally indicated by numeral 20 including stator and rotor components adapted to be mounted inside a housing means including a sheet metal cylindrical body portion 21 having opposite open ends internally chamfered as indicated at 22 and adapted to be provided with end cover means 23. These end cover means can be angular metal pieces or discs having a plurality of axial apertures or holes 24 adjacent to edges thereof and provided with a central hub portion 25 indicated in phantom in FIGURE 2 and provided for bearing support and journalling of a shaft of a rotor. Such a shaft 26 and a rotor means including a cast pulley-like portion 27 as well as a spiral metal lamination-like portion 28 provided with a cast metal squirrel-cage type winding 29 can be seen as indicated in phantom in views of FIGURES 1 and 2. Located radially outside the rotor means there is a multi-portion stator means which comprises a spiral outer portion S provided with axially or longitudinally extending welds W in predetermined locations in each of the quadrants of the angular spiral subsequently press-fitted to an inner periphery of the cylindrical body portion 21 as well as a radially inner stator portion which will be described in further detail in the following paragraphs.

It is to be noted that the housing means including body portion 21 and end cover means 23 as well as stator portion S can be held together free of any rivets as well as any through bolts previously used to hold dynamoelectric machine components in assembled relationship. The radially outer stator portion S can be provided with the welds W either prior to assembly with the cylindrical body portion 21 or the outer spiral portion S can be maintained in a predetermined press-together relationship inside the periphery of the body portion and provided with spot-like end welds to hold the stator portion S directly in place inside the body portion. Such welding of the stator portion S to the body portion will add rigidity and strength to the frame-like housing and as will become more apparent later, there is no need for ever separating the stator portion S from the body portion once they are joined together.

FIGURES 1 through 4 illustrate a fastening means generally indicated by numeral 30 useful with the rotor and stator structure of the present disclosure as well as that of copending application Ser. No. 70,262, filed Nov. 18, 1960, now Patent 3,188,505, Wiley, issued June 8, 1965, and belonging to the assignee of the present invention. It is to be noted that a "tin can" motor housing of copending application Ser. No. 759,475, filed Sept. 8, 1958, now Patent 3,081,411, Wiley, issued Mar. 12, 1963, and belonging to the assignee of the present invention could also be used for the rotor and stator components in accordance with the present invention. The fastening means 30 in accordance with the present invention could also be used for the housing assemblies previously disclosed such as noted in the aforementioned copending applications. Each fastening means 30 includes a substantially L-shaped body portion 31 including a relatively short leg having a dimple or conically embossed projecting portion 32 provided adjacent to a free end thereof. As can be best seen in the cross-sectional view of FIGURE 2, this dimple or conical projection portion 32 is adapted to be snap-fitted axially into the opening or aperture 24 provided along or adjacent to an outer periphery of the end covers 23. Resilience of the relatively short leg having the dimple or conical portion 32 projecting therefrom is enhanced by having a substantially curved and elbow-shaped juncture 33 interconnecting the relatively short and a relatively longer leg of the body portion 31. A substantially U-shaped embossing 34 is provided centrally relative to the elbow-shaped juncture or corner 33 and this embossing 34 enhances maintenance of the substantially L-shape of the fastening means 30. The relatively longer leg of the body portion 31 terminates in a laterally offset end portion 35 joined to the body portion 31 by a transverse or substantially lateral extension 36 as can be best seen in the cross-sectional view of FIGURE 2. The cylindrical body 21 of the dynamoelectric machine housing is provided with a plurality of radially outwardly extending and arcuately separated slots 37 through which the end portions 35 can be fitted so as to be hooked along an inner periphery of the cylindrical body 21 while the substantially transverse extension 36 becomes lodged and anchored in such slots 37 so as to preclude longitudinal or axial movement of the fastening means 30 except for resilient snap-fitting of the dimple or conical portion 32 into the openings or apertures 24 as permitted by limited pivoting of the end portion 35 and lateral extension 36 relative to each slot 37 as well as permitted by the semi-arcuate juncture 33 which interconnects the long and short legs of the body portion 31. This spring-clip fastening means 30 can hold the end heads or covers 23 in place and can permit quick removal and installation of the end covers 23 for a complete change of winding means in a dynamoelectric machine in a matter of relatively few minutes. Use of through bolts as well as rivets and the like can be avoided and a minimum of time and labor is required to gain access to the stator winding portion as well as rotor means in accordance with the present invention. The rotor means can include a laminated spiral 28 noted earlier and formed by bending of a continuous strip of metal 38 having apertures or openings 39 therein as indicated in phantom in a portion of the view of FIGURE 1. Further details as to structure of rotor means usable in accordance with the present invention will be provided later in this specification.

Figures 2, 3, 4:
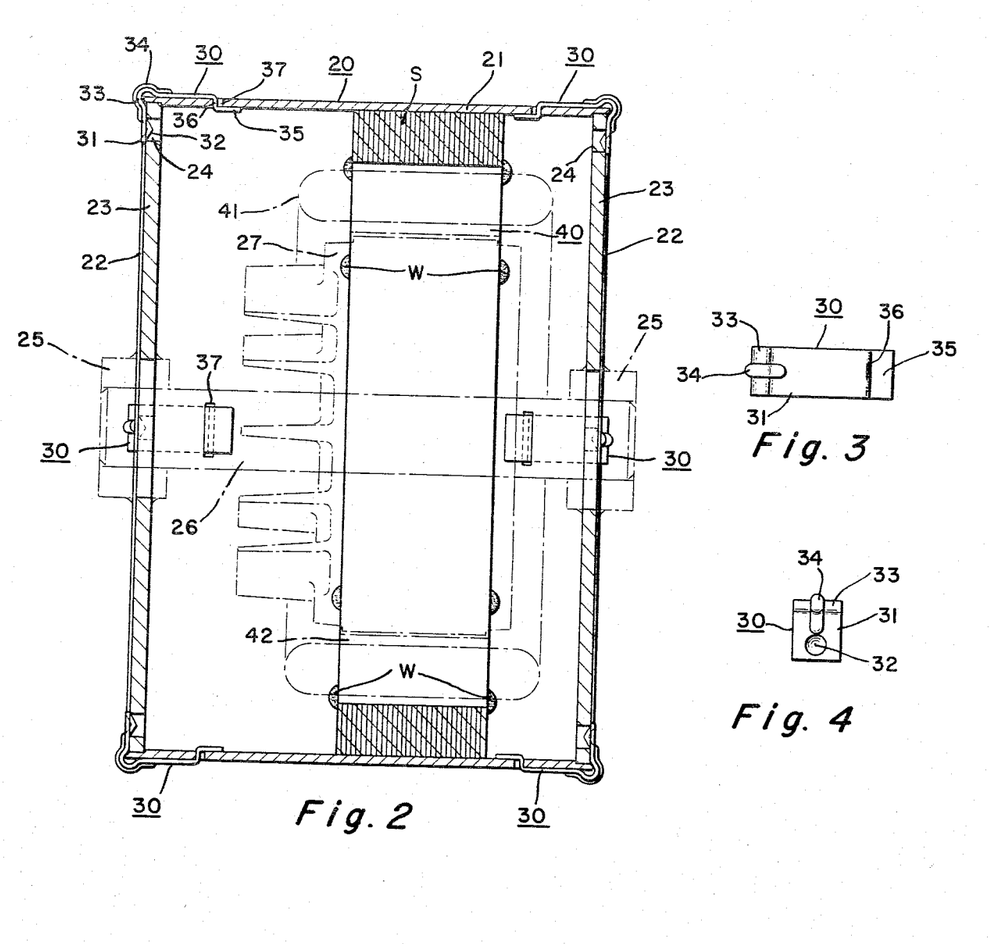
FIGURE 2 is a cross-sectioned elevational view of the assembly in FIGURE 1 including an elevational showing of fastening means used therewith and phantom outline of certain components for clarity.
FIGURE 3 is a plan view of the fastening means per se used in the assembly of FIGURES 1 and 2.
FIGURE 4 is an end view of the fastening means per se of FIGURE 3.
Figure 5:
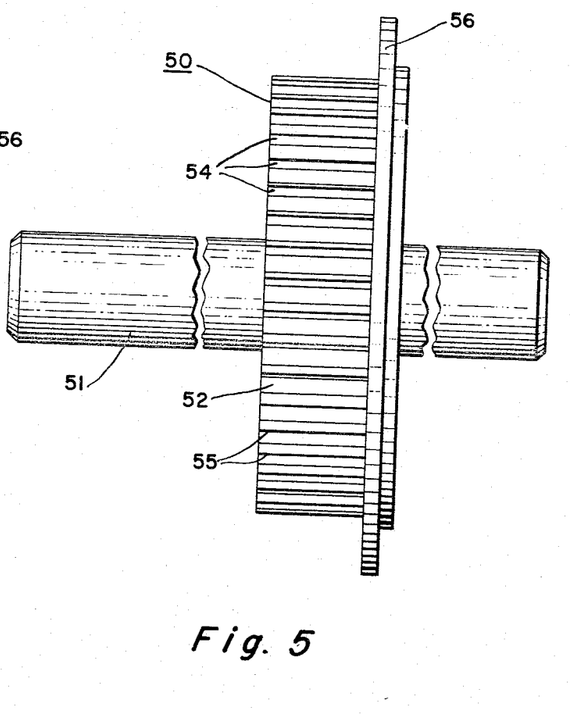
FIGURE 5 is a side view of an arbor used to spiral a stator portion in accordance with the present invention.
Figure 6:
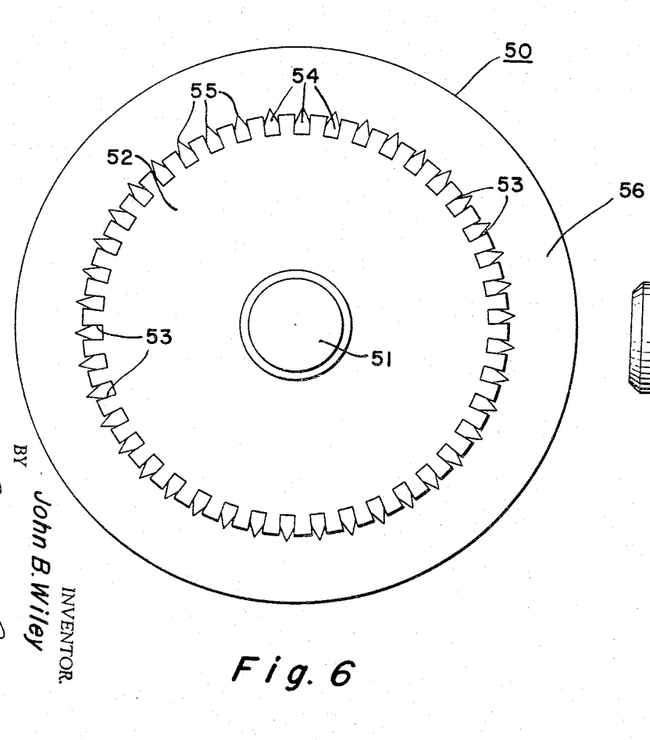
FIGURE 6 is an end view of the arbor of FIGURE 5.

A stator winding portion generally indicated by numeral 40 can be seen in views of FIGURES 1 and 2 and includes wiring or conductors 41 having end turns on each of opposite sides of a radially inner stator lamination portion 42 formed by spiralling a longitudinally extending and continuous strip of metal 43 indicated in phantom in FIGURE 1. FIGURES 5 and 6 provide side and end views, respectively, of a winding arbor or mandrel means generally indicated by numeral 50 and including a shaft 51 that carries an annular body portion 52 thereon. The annular body portion 52 is located radially outwardly on the shaft 51 and has a plurality of slots 53 in which a predetermined number of keys 54 can be press-fitted or otherwise secured so as to have substantially triangular outer ends 55 thereof projecting beyond an outer periphery of the slotted body portion 52 of the winding arbor or mandrel means. Axially to one side of the keys and body portion 52 there is a backup plate means 56 having a diameter substantially larger than that of the body portion 52 and this backup plate means can be mounted to extend radially outwardly immediately adjacent to the sharp edges 55 of keys 54 carried by slots 53 in the body portion 52 of the winding arbor or mandrel 50 which can be suitably journalled relative to fixed bearings (not shown) to permit rotation of the body portion and keys thereon so as to permit spiral bending of the strip material 43 in a manner similar to that disclosed in the copending application Ser. No. 70,262, filed Nov. 18, 1960, now Patent 3,188,505, Wiley, issued June 8, 1965.

Figure 7:
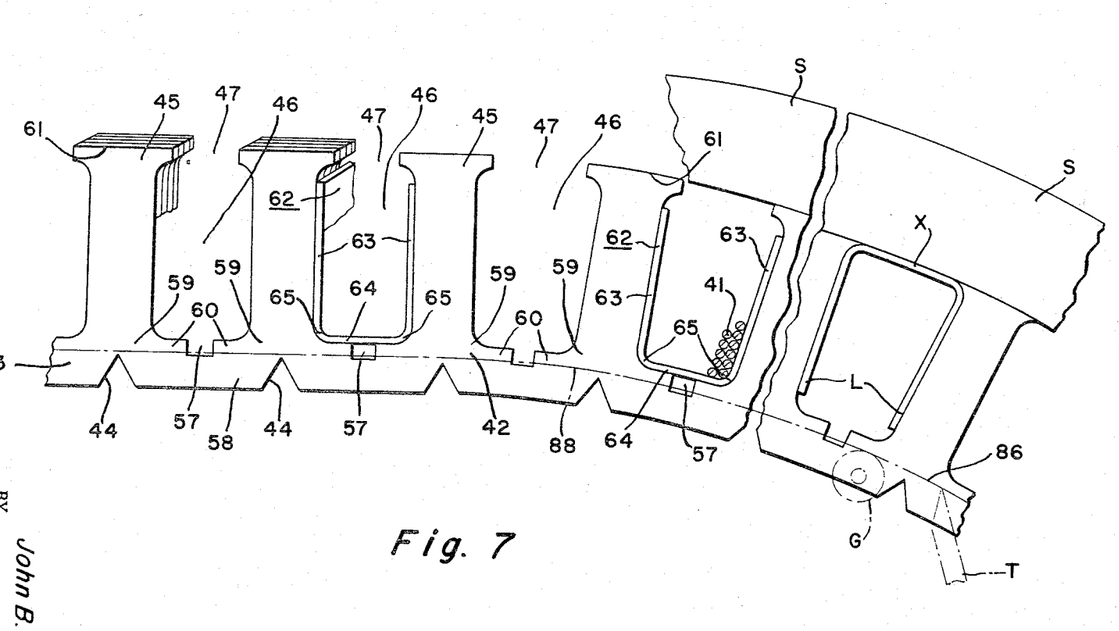
FIGURE 7 is an enlarged fragmentary side view of a stator portion and insulation therewith in accordance with the present invention.

FIGURE 7 provides an enlarged fragmentary side view of metal strip 43 bent to form the radially inner stator portion 42 as well as insulation therewith in accordance with the present invention. The metal strip 43 has a plurality of V-shaped cutouts 44 extending laterally inwardly from one edge thereof and substantially in alignment with a plurality of teeth 45 initially substantially parallel to each other so as to define slots 46 to which access is provided by way of openings 47. The slots 46 and openings 47 are stamped or punched into the metal strip 43 prior to arcuate bending and spiralling thereof such that there is less waste material in metal blanks removed therefrom for size of openings and slots which are substantially expanded as the teeth 45 become arcuately separated from each other to be radially positioned rather than substantially parallel to each other. This savings in metal materials was referred to in the copending application Ser. No. 70,262, filed Nov. 18, 1960, now Patent 3,188,505, Wiley, issued June 8, 1965, and further modification and improvement can be provided in accordance with the present invention by having a notch 57 extending into a bottom of each slot 46 substantially centrally thereof. This notch 57 has a substantially square or rectangular configuration with a width at least equal to or substantially twice the size of a radially located air gap between an outer periphery of a rotor means and an inner periphery of the stator portion 42 once formation and assembly thereof is completed in accordance with the present invention. Each notch 57 extends laterally into a bridge portion 58 interconnected by hinge-like junctures 59 adjacent to each notch or cutout 44 having the substantially shallow V-shaped configuration in alignment with teeth 45. Between each hinge-like juncture 59 and notch 57 there is a shoulder-like projection 60 purpose of which will become more apparent from the following description. Each cutout 44 is adapted to mesh with the sharp outer end of a key 54 during spiralling or arcuate bending or spiralling of the metal strip 43, the cutouts 44 and particularly the notches 57 permit deformation of metal relative to hinge-like junctures 59 and bridges 58 adapted to interconnect and carry the teeth 45 during formation of the radially inner stator portion 42 in accordance with the present invention. Depth of each notch 57 is greater than radial air gap to be provided between an outer periphery of the rotor means and an inner periphery of the stator portion 42.

Once the metal strip 43 has been arcuately bent and spiralled so as to expand and increase the size of the slot 46 the width of initial slot opening 47 is also increased as is apparent in an intermediate part of the fragmentary view of FIGURE 7. Slots 46 of the metal strip 43 during spiralling become substantially aligned with axially adjacent slots and the keys 54 which can total forty-two, for example, for a particular dynamoelectric machine configuration assure proper alignment of teeth adjacent to each other. These teeth 45 together with the extensions 60 on opposite sides of each of the notches 57 can have a substantially I-shaped. Upon completion of the arcuate bending or spiralling of the metal strip 43 the diametrically outer edges 61 of teeth 45 can be left rough and unfinished or can be provided with a slightly tapered periphery adapted to be press-fitted to an inner periphery of the outer stator portion S. Alignment of the teeth 45 and slots 46 axially adjacent to each other can be facilitated by provision of the relatively shallow cutouts 44 in conjunction with the notches 57 such that metal of bridges 58 can be more readily stretched during the arcuate bending or spiralling operation. Without the notches 57 the bridges 58 would be relatively solid and inflexible whereas each of the notches 57 can permit any dimensional discrepancy or punching error to be corrected for every tooth 45. Such dimensional discrepancies or punching errors will be obviated or eliminated during progressive spiralling because the metal bridges 58 can always be pulled and stretched though they could not be contracted or pushed together just as a chain or rope can be subjected to pulling but not necessarily pushing together for reduction of length thereof.

Figures 8, 9:
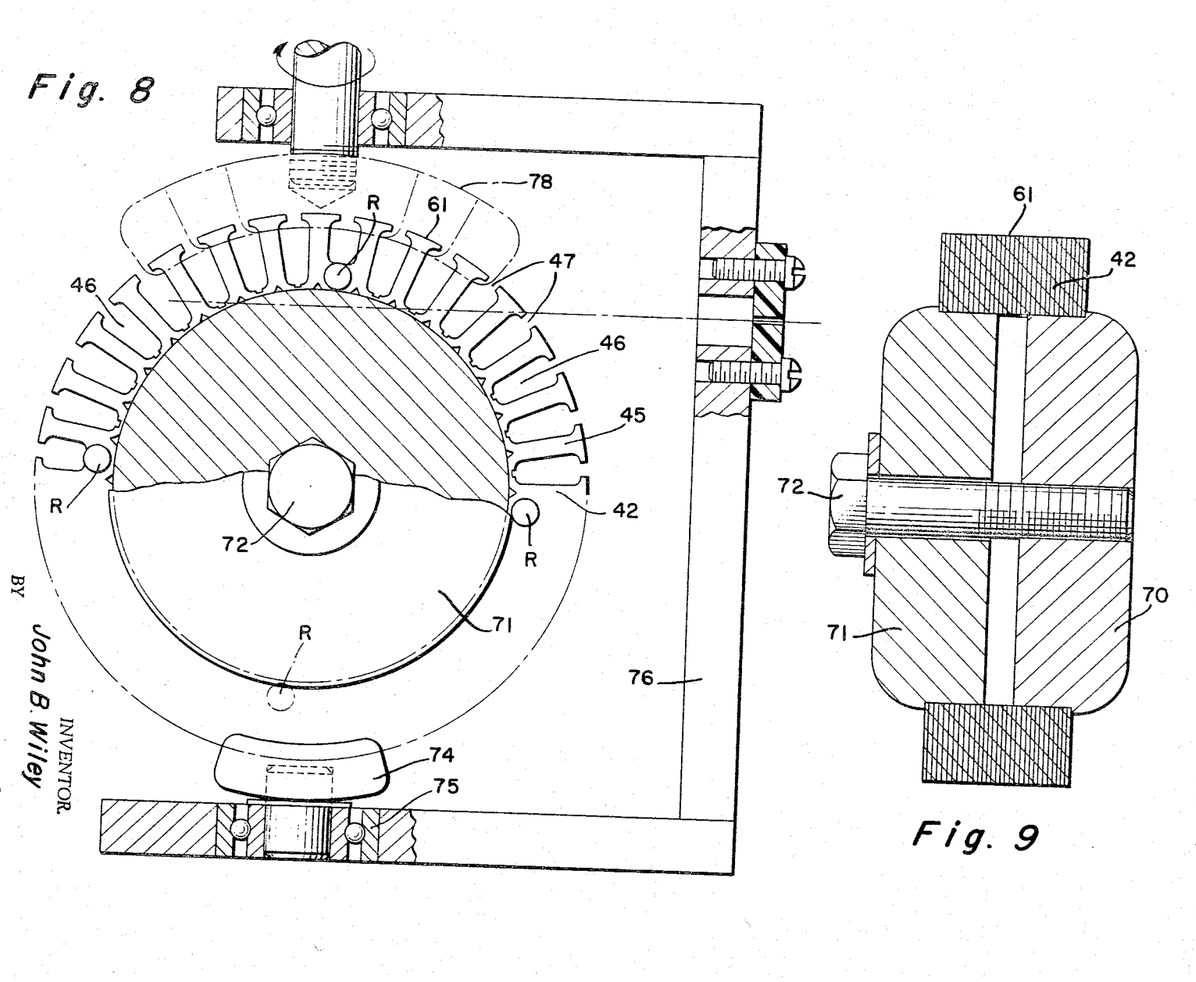
FIGURE 8 is an elevational view of coil winding means for use in accordance with the present invention.
FIGURE 9 is a side view of support means for a stator portion to be held in the winding means of FIGURE 8.

To effect a saving in insulating material as possible in accordance with the present invention, it is to be noted that slot lining means generally indicated by numeral 62 can be fitted into each of the slots 46 either before or after tapering of the outer peripheral edges 61 of teeth 45 if such tapering is provided. Each slot linear means 62 can include a pair of legs 63 joined by a relatively short transverse bottom 64 adapted to be fitted over each notch 57. Since the notch 57 is located radially inwardly from the expanded slot openings 47 it is apparent that arcuate distance of the short bottom 64 of each piece of insulation will be less than an arcuate distance immediately adjacent to each slot opening 47. Even upon expansion of the slot 46 the legs 63 of the slot liner means 62 remain adjacent to radial edges of the teeth 45 in response to resilience of the insulating material thereof which pivots or is subject to hinge-like movement relative to corners 65 adjacent to opposite ends of the short bottom 64 once the slot liner means 62 has been inserted through a slot opening 47. Thus, a savings in metal material results due to punching out only a relatively small blank to form the slot 46 which becomes expanded during spiralling but also a saving in insulating material can be effected by fitting slot liner means 62 radially inwardly through openings to have bottoms 64 thereof fit over the notches 57. Savings in insulating material can be appreciable when high volume mass production of dynamoelectric machines for use on appliances is undertaken or when a subassembly such as the radially inner stator portion 42 is provided on motor vehicle generators or alternators produced for vehicles in large quantities. To illustrate saving in insulating material there is provided an illustration of one slot liner means also having legs L of a length substantially equal to that of legs 63 of the slot liner means 62 but having a relatively wider base X than the base or bottom 64 of the slot liner means 62. Since the base X is located radially farther out than the bottom 64 it follows that a greater quantity or length of insulating material is required per slot to form such a slot lining means even though the same size of slot is being insulated. It is to be noted that a conventional stator lamination assembly including an annular sheet metal stamping having radially inner slots therein formed by axial stacking of such laminations would also require slot liner means having such a larger base X. In such a conventional stator lamination assembly it would be necessary to fit stator wiring or conductors through radially inner locations which would correspond to location of notches 57 in accordance with the present invention. Slot liner means 62 could not be fitted to such conventional slotted laminations since the relatively shorter bottom 64 of the slot liner means 62 would result in closure of slot openings so as to prevent placement of stator windings or conductors therein. However, in accordance with the present invention the slot openings 47 provide access to slots 46 from an outer periphery of the stator portion 42 and views of FIGURES 8 and 9 provide diagrammatic representation of a coil winder means that can be used to effect placement of stator windings in slots 46.

The metal strip 43 can be continuously and arcuately bent or spiralled on the winding arbor 50 of FIGURES 5 and 6 until a width of substantially one to one and one-half inches is attained for the radially inner stator portion 42 which can be held together by suitable fastening means such as rivets R and the like in predetermined locations of each of the quadrants thereof. The radially inner stator portion 42 can then be clamped between a pair of annular discs 70 and 71 held together by a fastening means 72 as shown in FIGURE 9 and pivotally supported by an arcuate segment 74 journalled by bearing means 75 for movement relative to a yoke or substantially C-shaped carriage 76 the stator windings can be preformed on a separate coil former (not shown) or can be machine wound directly into the slots depending upon the particular coil winder apparatus used. The coil winder apparatus per se forms no part of the present invention and FIGURES 8 and 9 are provided merely to illustrate that stator windings can be fitted in a predetermined pattern 78 into predetermined slots 46 by way of slot openings 47 located along an outer periphery of the stator portion 42. The coil winder apparatus can be adapted for placement and quick removal of a stator portion 42 previously fitted with slot liner means 62.

Figure 10:
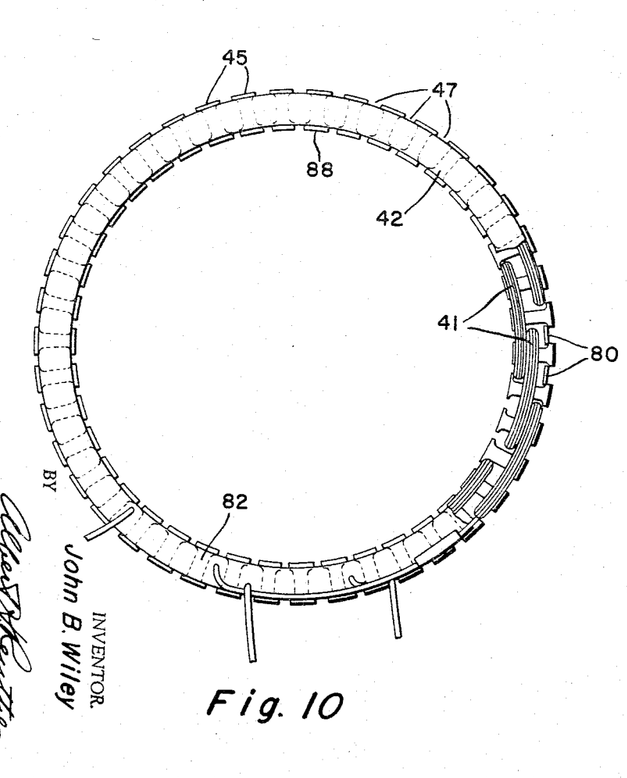
FIGURE 10 is an end view of a stator portion in accordance with the present invention.
Figure 11:
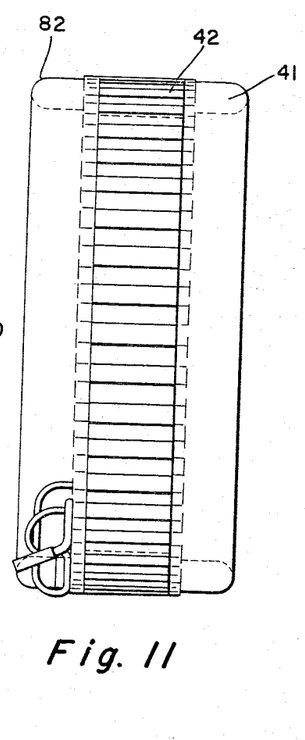
FIGURE 11 is a side view of a stator portion of FIGURE 10 for an alternator in accordance with the present invention.
Figure 12:
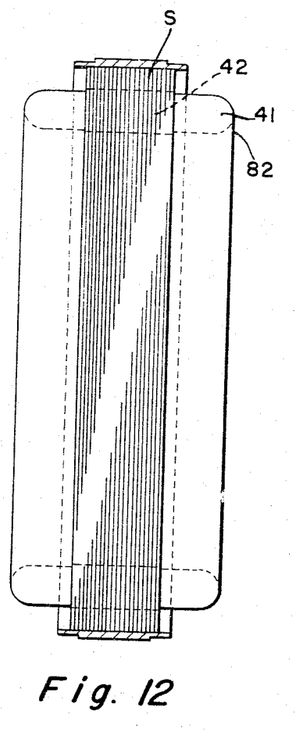
FIGURE 12 is a side view of the stator portions for an alternator in accordance with the present invention.

A radially inner stator portion 42 fitted with stator windings assembled thereto from radially outer slot openings 47 can be seen in FIGURES 10 and 11. Each of the slot openings 47 can be closed with peg means 80 totalling forty-two in number if the same number of teeth and cutouts 44 were provided for a particular stator and coil subassembly 42. It is to be noted that in the event this stator portion or subassembly 42 is to be used on a motor vehicle alternator the stator windings can include seven coils per phase having eleven turns of wire or conductor for each coil of a three phase, fourteen pole alternator. The stator and coil subassembly or portion 42 can be preheated to a temperature in a range between 275° and 300° F. for at least one-half hour followed by a dipping or coating with a varnish-like or plastic resin covering 82 to encapsulate and hold the stator windings 41 as well as teeth 45, slot liner means 62 and peg means 80 together in insulated and protected condition. Slotted stator or dynamoelectric machine components can be covered with a substantially uniform coating of plastic particles made of materials such as nylon, polyethylene, epoxy resin, acrylics, vinyls and the like suspended in a solid state in a gaseous medium as disclosed in copending application Ser. No. 64,324 filed Oct. 24, 1960, as well as Ser. No. 737,590, filed May 26, 1958, and both belonging to the assignee of the present invention. In some instances such a uniform coating can be provided on a stator component prior to fitting of windings into slots thereof and use of slot liner means 62 can be eliminated. However, for purposes of the present disclosure, the slot liner means 62 together with slot closing pegs 80 of insulating material such as phenolic and the like can be provided subject to encapsulation by the plastic particles in a uniform coating. Material savings realized by the use of the radially inner stator portion 42 in accordance with the present invention can be appreciable when compared with a conventional stator lamination assembly utilizing axial aligned metal lamination stampings. Since the slots 46 are expanded during spiralling there is less metal wasted and upwards of twenty to twenty-five percent steel can be saved by following the teaching of the present invention. Due to the difference in length of insulating material required for only the shorter bottoms 64 rather than the longer bottom X of slot liner means it is possible to effect at least a five percent savings in paper-like insulating material. Also, at least a ten percent savings in copper for stator windings or conductors can be effected in a winding operation which can be performed nearly ten times faster by fitting of wiring or conductors into enlarged slot openings 47 into slot locations adjacent to shorter bottom portions 64 of the slot lining means 62. FIGURE 12 illustrates a stator assembly including the radially inner stator or subassembly portion 42 press-fitted to engage the inner periphery of the stator yoke or outer radial portion S. A cylindrical body portion of a dynamoelectric machine housing can provide mounting support for the stator assembly including these radial inner and outer portions in accordance with the present invention. It is to be noted that the inner periphery of the outer stator portion S need not be machined or finished unless a taper fit is to be provided relative to an outer periphery of the inner stator portion 42 which can be similarly provided with a taper if desired. The taper can be very limited such as 0.01 inch for a one to one and one-half inch width of stator assembly formed of the spiral of metal strips as indicated earlier. The radially inner stator portion 42 can be easily removed and replaced by release of four fastening means such as clips 30 described for FIGURES 1 through 4. Four of such fastening means or clips 30 can be provided on each side of the dynamoelectric housing having slots 37 and apertures 24 provided in the body portion and end covers, respectively. Depending upon the material used for impregnation and encapsulation of the stator windings and inner spiral stator portion 42, there can be a curing of the insulating material for upwards to twelve hours at 270° to 300° F. Once the encapsulation is completed it is to be noted a further step in the procedure of producing the dynamoelectric machine stator component in accordance with the present invention occurs and for understanding of this additional operation in accordance with the present invention, reference is again made to FIGURE 7 of the drawings. An inner diameter of the spiralled stator portion 42 is machined to remove at least part of the metal or bridges 58. The extent of machining away of the bridges 58 can be such that an inner peripheral surface is provided to be concentric with respect to an outer periphery of a rotor means journalled to rotate centrally thereof. Suitable broaching means as well as a grinding wheel G or a cutting tool T indicated in the view of FIGURE 7 can be provided to perform this machining operation for removal of the bridges 58 either in part or completely. Preferably, the machining occurs to a depth indicated by a line 86 so as to effect opening of the notches 57 and complete removal of the cutouts 44. With the notches 57 machined all the way open or even machined part way open it is to be noted that the extensions 60 are such that I-shaped teeth 45 will remain having radially inner tooth faces or peripheral surface edges thereof indicated by reference numeral 88 extending for a larger arcuate distance than the edges 61 and thus providing a better flux path during dynamoelectric machine operation. Upon machining the bridges 58 away completely and opening of notches 57 all the way it is apparent that in effect the teeth 45 as embedded in the encapsulated stator portion 42 can be held in place at least in part by the stator windings 41 as well as by the insulating material or resin used for the encapsulation. The improved larger tooth space provided by machining open the notch 57 and extending along radially inner locations of the extensions 60 is such that a minimum opening of the slots 46 is provided and this opening is closed by the relatively short bottom 64 of the slot liner means 62. Use of broaching fluid can avoid presence of metal slivers and the end result is that the teeth 45 alone remain in radial positions as mechanically maintained by the encapsulating material as well as the stator windings. It is to be noted that the teeth 45 are electrically and magnetically maintained in position also once the dynamoelectric machine is energized and magnetic flux path results in attraction or magnetic forcing of the teeth for expansion and outward location of the teeth so that the teeth 45 along edges 61 become electrically locked to an inner periphery of the spiral outer stator portion S. This magnetic attraction of teeth 45 along edges 61 immediately adjacent to the inner periphery of the outer spiral stator portion S occurs since there is less air gap relative to the press-fitting engagement of the teeth to the outer stator portion S and there is greater air gap between the faces 88 of the teeth relative to a rotor air gap. The press-fitting mechanical engagement of the teeth along the edges 61 with respect to the inner periphery of the outer stator portion S of a spiral of metal strip material results in mechanical interlock to resist dislocation of the teeth under torque forces. Perfect concentricity need not be maintained between the edges 61 of the teeth 45 and the outer spiral stator portion S because the bore and tooth faces 88 are not machined until later or subsequent to encapsulation of the radially inner stator component or subassembly 42 which can be removed. The outer spiral stator portion S need not have through bolts or rivets therein to detract from continuous magnetic material as a flux path and theoretically the teeth 45 are "loose" though the teeth are locked mechanically and electrically in a keystone-like or brick-arch-like subassembly including the stator windings and encapsulated covering thereof. Due to final machining or broaching of the bore of the inner stator portion there is greater width of the tooth faces along a radially inner end of each of the teeth and the width of each notch 57 can be punched in the strip of metal later to be machined open to have an optimum dimension for electrical performance without consideration for mechanical purposes as to slot fill since the slots 46 are fitted with wiring or conductors through the original or initial opening 47 on an opposite side remote from the notches 57. Removal of the fastening means or four clips on either one of the ends of the dynamoelectric machine housing will provide access to the radially inner stator portion or subassembly 42 so as to permit a change of winding without necessitating removal of through bolts, rivets and the like and without separating the outer stator portion S of spiral material from the body portion such as 21 of the dynamoelectric machine housing. Encapsulation equipment can be any commercially available type and use of fluidized-bed type equipment is optional. Testing of dynamoelectric machine structure in accordance with the present invention reveals that a starting torque of 2.04 foot-pounds at 41.5 amperes can be obtained to be at least equal to that of a motor or generator made using conventional stator lamination assembly structure. Since the end covers 23 can be snapped in place with clips there is a minimum of servicing time and labor involved to gain access to the radially inner stator portion or subassembly 42 in accordance with the present invention as well as to the rotor means which can be of a squirrel-cage type conventionally made or made in accordance with the disclosure of copending application Ser. No. 70,262, filed Nov. 18, 1960, now Patent 3,188,505, Wiley, issued June 8, 1965, as well as in accordance with structure of views of FIGURES 13, 14 and 15 of the drawings herewith.

Figures 13, 14:
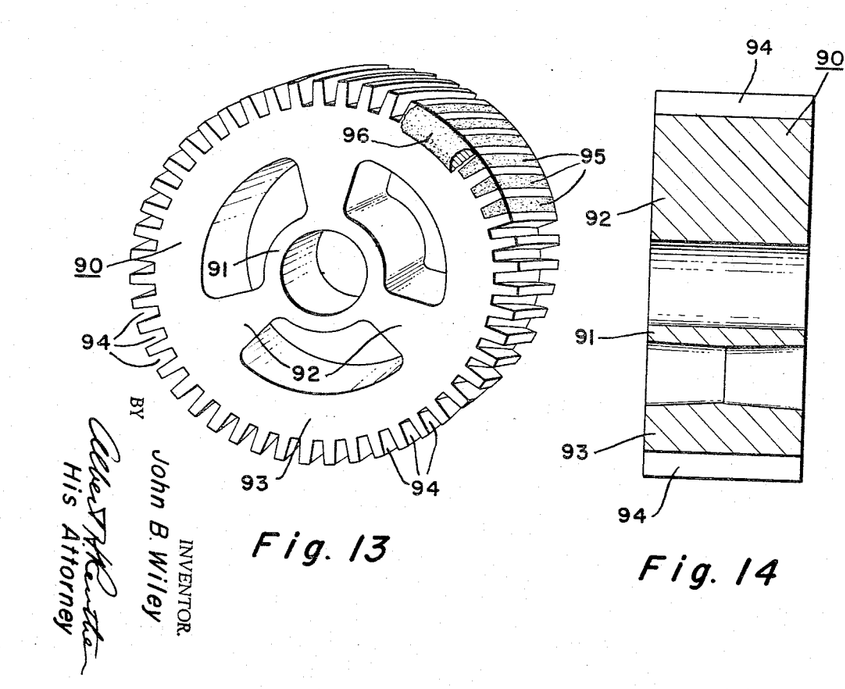
FIGURE 13 is an end perspective view of rotor means of malleable iron machined for use in accordance with the present invention.
FIGURE 14 is a cross-sectioned elevational view of the rotor means of FIGURE 13.

In FIGURE 13 there is shown a rotor means generally indicated by numeral 90 having a central hub portion 91 joined by radial portions 92 to an outer annular body portion 93 in which peripheral slots 94 can be machined either axially or in skewed relation thereto. These slots 94 can be provided with cast aluminum winding means 95 interconnected by integral end rings 96 which hold together cast metal provided in the slots 94. The rotor means 90 need not be laminated and the slots 94 as defined by teeth can be broached, hobbed or milled into the outer periphery of the malleable iron casting which is relatively cheap and requires no open hearth or blast furnace operation. Skew of slots can be machined in place during milling and any solid magnetic core can be provided with any number of slots for use as a rotor means.

Figure 15:
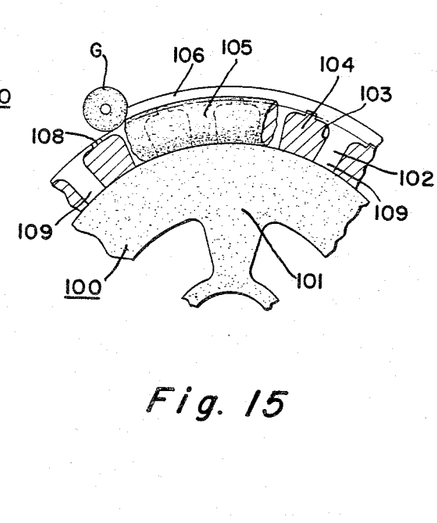
FIGURE 15 is a fragmentary end view of a rotor means also in accordance with the present invention.

FIGURE 14 shows a cross-sectional view of the rotor means of FIGURE 13 and in FIGURE 15 there is a fragmentary showing of further rotor means generally indicated by numeral 100 including a sintered-metal pulley-like central portion 101 around which a spiral metal material 102 can be press-fitted to have slots 103 thereof provided with a cast metal winding 104 having integral end rings 105. The outer diameter of the spiral metal portion 102 can be trimmed or machined away such as by a grinding means G and the like so as to remove bridges 106 of metal and to open notches 108 leaving only individual teeth held together by the cast winding 104–105. By opening the notches 108 on strip material of metal used as spiralled around the rotor central portion 101 there is improved performance and in effect individual teeth 109 held together by the cast metal 104–105 subsequent to machining away the bridges 106. Thus, "loose" teeth can be provided for both stator and rotor assemblies in accordance with the present invention and the spiralling of the metal strip can be accomplished to incorporate skew of conductors bars to be provided in slots therewith by having the keps such as 54 located angularly with respect to axis of suitable mandrel means similar to the arbor 52 shown in FIGURES 5 and 6 of the drawings. Dynamoelectric machine noise due to harmonics and electrical hum can be avoided by having increased surface along edges 88 of the radially inner stator component having a larger percentage of tooth face to have better flux distribution in magnetic material provided. For the sintered-iron rotor means of FIGURE 15 powdered metal particles of any suitable material can be provided without concern for annealing as well as silicon content thereof. Mechanical press-fit or taper-lock as well as electrical-magnetic attraction of "loose" teeth can be advantageously used to effect an efficient and inexpensive dynamo-electric machine assembly in accordance with the present invention. As to width of notches or depth of notches such as 57 and 108 there need be no restriction as to bridge material adjacent thereto during punching since any width that will permit spiralling of the strip material can be used because the bridges are subject to subsequent machining and removal. A radially inner stator portion or subassembly 42 fitted with windings encapsulated with teeth can be releasable and subject to replacement by following procedure in accordance with the present invention.

While the embodiments of the present invention as herein disclosed constitute preferred forms, it is to be understood that other forms might be adapted.

What is claimed is as follows:

1. In a dynamoelectric machine having a housing with a substantially cylindrical body portion complementary to readily removable end cover means that journal rotor means and having a first stator portion of spiral metal material with axially tapered peripheral configuration substantially solid throughout carried tightly inside the body portion in a location radially outwardly from stator winding means, the improvement which comprises a second stator portion including both "loose" metal teeth per se in plural radial locations and an anchor encapsulation material exemplified by varnish-type, epoxy and plastic resin that substantially fills space between said teeth per se and the stator winding means into an annular unitary though removable mass also having an axially tapered peripheral configuration, said second stator portion having a mechanical tapered interfit axially complementary to the material of the first stator portion as well as having magnetic attraction of said "loose" teeth per se to the material of the first stator portion that holds said second stator portion in place structurally though removable axially therefrom.

2. In a dynamoelectric machine having a housing with a substantially cylindrical body portion complementary to readily removable end cover means that journal rotor means and having a first stator portion of spiral metal material substantially solid throughout carried tightly inside the body portion in a location radially outwardly from stator winding means, the combination therewith of a second stator portion including both "loose" metal substantially I-shaped teeth per se in plural radial locations as well as an anchor encapsulation material of plastic resin that substantially fills space between said teeth per se and the stator winding means into a replaceable subassembly, said second stator portion having a mechanical press interfit axially replaceable in one direction only along mutual conical-taper periphery complementary to the material of the first stator portion and having magnetic attraction of said "loose" teeth per se to the first stator portion that holds said second stator portion in place structurally within the housing, and plural clip-like fastening means of resilient elbow-shape metal that bridges the body portion and at least one readily removable end cover means in interlock snap fit where said second stator portion as the subassembly is axially replaceable in one direction only due to said mutual conical-taper periphery relationship.

3. A dynamoelectric machine assembly comprising, a housing member having a substantially cylindrical body portion fitted with readily removable end cover means, a first stator portion of continuous spiral metal material substantially solid throughout fitted tightly within and carried by said body portion, a second stator portion including "loose" metal teeth per se in plural radial locations to provide slots therebetween and stator windings contained within said slots encapsulated within an encapsulation material which substantially fills the spaces between said teeth per se and said stator windings to provide a unitary annular unit readily removable as a subassembly from said first stator portion, slot lining means of insulating material fitted in said slots between said teeth having a relatively short bottom portion means located radially inwardly remote from the radially outer slot openings and rotor means journalled by said end covers and located radially inside said first and second portions.

References Cited by the Examiner
UNITED STATES PATENTS

| | | | |
|---|---|---|---|
| 1,657,152 | 1/1928 | Dahl | 292—87 |
| 1,957,380 | 5/1934 | Barlow | 310—259 |
| 2,276,793 | 3/1942 | Prince | 310—216 |
| 2,384,310 | 9/1945 | Judd. | |
| 2,456,934 | 12/1945 | Feiertag | 310—254 |
| 2,695,969 | 11/1954 | Yates | 310—259 |
| 2,919,357 | 12/1959 | Lung | 310—259 X |
| 3,188,505 | 6/1965 | Wiley | 310—259 |

MILTON O. HIRSHFIELD, Primary Examiner.

L. L. SMITH, Assistant Examiner.